(12) United States Patent
Griffin et al.

(10) Patent No.: US 12,171,047 B2
(45) Date of Patent: Dec. 17, 2024

(54) RELATIVE LOCATION CONDITIONED STAGED DOWNLOAD SERVICE FOR INTERNET-OF-THINGS (IoTs)

(71) Applicant: Red Hat, Inc., Raleigh, NC (US)

(72) Inventors: Leigh Griffin, Waterford (IE); Pierre-Yves Chibon, Saint-Pol-de-Léon (FR)

(73) Assignee: Red Hat, Inc., Raleigh, NC (US)

( * ) Notice: Subject to any disclaimer, the term of this patent is extended or adjusted under 35 U.S.C. 154(b) by 355 days.

(21) Appl. No.: 17/850,797

(22) Filed: Jun. 27, 2022

(65) Prior Publication Data

US 2023/0422022 A1    Dec. 28, 2023

(51) Int. Cl.
*H04W 8/24*     (2009.01)
*G06F 8/65*     (2018.01)
*H04L 67/00*    (2022.01)

(52) U.S. Cl.
CPC .............. *H04W 8/245* (2013.01); *G06F 8/65* (2013.01); *H04L 67/34* (2013.01)

(58) Field of Classification Search
CPC ....... H04W 4/80; H04W 28/06; H04W 4/185; H04W 52/0212; H04W 52/0219; H04W 84/12; H04W 84/10; H04W 28/14; H04W 84/18; G06F 8/65
See application file for complete search history.

(56) References Cited

U.S. PATENT DOCUMENTS

| | | | |
|---|---|---|---|
| 9,917,903 B2 | 3/2018 | Clernon | |
| 10,360,021 B2 | 7/2019 | Pereira Cabral et al. | |
| 10,838,705 B2 | 11/2020 | Riedl et al. | |
| 10,979,299 B1 | 4/2021 | Askar | |
| 2004/0068721 A1* | 4/2004 | O'Neill | G06F 8/65 709/202 |
| 2005/0114896 A1* | 5/2005 | Hug | H04N 21/44204 725/90 |

(Continued)

OTHER PUBLICATIONS

Thales Group, "IoT Software Updates: Mobilize Thales OTA solutions," Paris, France, https://www.thalesgroup.com/en/markets/digital-identity-and-security/iot/iot-services/update-iot-devices.

(Continued)

*Primary Examiner* — Olumide Ajibade Akonai
(74) *Attorney, Agent, or Firm* — Womble Bond Dickinson (US) LLP

(57) ABSTRACT

Methods, systems, and computer program products of this disclosure provide a staged transmission service (e.g., a data transfer service for downloading or uploading) at a transfer node to a device in motion (DIM) wirelessly paired to the transfer node. When a DIM accepts a download task, the download node paired with the DIM receives a notice from the DIM of the acceptance. The download node retrieves, from a data repository, a dataset specified by the download task. A processing device of the download node may stage the dataset in a staged download service in preparation to transfer the dataset to the DIM. The processing device may initiate a transfer of at least a portion of the dataset to the DIM responsive to one or more data transfer properties satisfying a predefined set of conditions. The data transfer properties are determined based on a location and a movement of the DIM.

20 Claims, 6 Drawing Sheets

(56) References Cited

U.S. PATENT DOCUMENTS

| | | | |
|---|---|---|---|
| 2010/0016683 A1* | 1/2010 | Lemmers | H04L 12/2825 |
| | | | 715/764 |
| 2010/0095293 A1* | 4/2010 | O'Neill | G06F 8/65 |
| | | | 717/173 |
| 2011/0211584 A1* | 9/2011 | Mahmoud | H04L 12/2838 |
| | | | 370/401 |
| 2014/0025769 A1* | 1/2014 | Shrum, Jr. | G06F 16/9574 |
| | | | 709/213 |
| 2015/0133049 A1* | 5/2015 | Lee | H04W 4/60 |
| | | | 455/41.1 |
| 2016/0040903 A1* | 2/2016 | Emmons | H04M 11/007 |
| | | | 700/278 |
| 2016/0381624 A1* | 12/2016 | Vincent | H04L 67/289 |
| | | | 455/41.2 |
| 2018/0048710 A1 | 2/2018 | Altin | |
| 2019/0132219 A1* | 5/2019 | Gandhi | H04L 41/5003 |
| 2019/0391800 A1 | 12/2019 | More et al. | |
| 2022/0311737 A1* | 9/2022 | Lee | H04L 12/28 |

OTHER PUBLICATIONS

IoT Atlas, "Software Update," https://iotatlas.net/en/patterns/software_update/.

* cited by examiner

RELATIVE LOCATION CONDITIONED STAGED DOWNLOAD SERVICE FOR INTERNET-OF-THINGS (IoTs)

BACKGROUND

An electronic device often operates according to a firmware or an operating system. The firmware or the operating system includes a class of software that provides control of hardware of the electronic device (the operating system may include a higher level class of software than that of the firmware). The functionalities of the hardware, such as efficiency, security, ease of use, or software implementations, may be improved by updating the firmware or the operating system.

Electronic devices with communication capabilities (e.g., access to the internet or cellular networks) may regularly update software therein, including updating the operating system and/or the firmware, along with updating specific software packages to newer versions. These updates may be significant in size. When the electronic devices use wireless networks for such updates, the updates may be interrupted due to varying conditions of the wireless networks. The interrupted update may require a restart of the download or other errors if an operating system or firmware update is involved. Available system resources are also limited or decreased during such download, making an interrupted download cause underutilization of the system resources. In some cases, an update notification may prompt to a user that an update is available, but recommend not to install the update until connection with a more reliable network than the current network is established. However, such delayed installation risks timely security updates or other updates with time sensitivity.

Some electronic devices may have natural mobility, such as an automobile (or sensors therein) of IoT devices carried by a moving object. The movements of these electronic devices may naturally bring problems to connectivity and data access. Updating such a mobile device may face potential connectivity loss, resulting in aborting of an update and wasting CPU cycles, or even potentially locking the device out from client requests while trying to process the update (some IoT devices are not operable when being updated). Some IoT devices, such as wireless sensors (e.g., IP cameras), may not have sufficient storage to hold a complete installation package and rely on connectivity for such update. An interruption of connectivity to such IoT devices may render them inoperable until manual or factory reset can be performed.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the scope of the described embodiments.

Like numerals indicate like elements.

DETAILED DESCRIPTION

Figure 1:
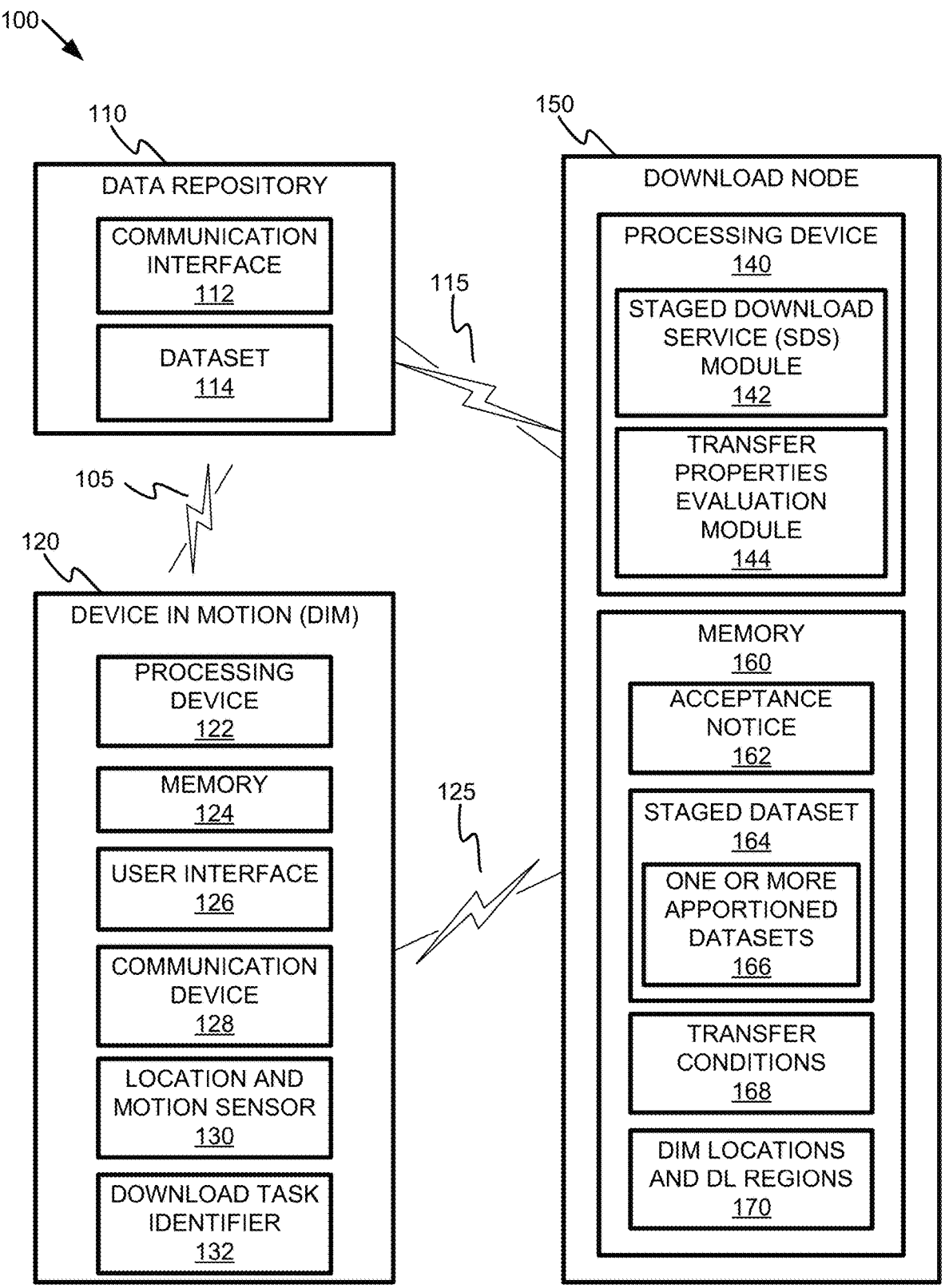
FIG. 1 depicts a high-level component diagram of an illustrative example of a download node and a device in motion (DIM), in accordance with one or more aspects of the present disclosure.

The present disclosure provides techniques, processes, devices, and systems for providing a staged transmission service (e.g., a data transfer service for downloading or uploading) at a transfer node to a device in motion (DIM) wirelessly paired to the transfer node. For ease of description, the transfer node is described as a download node herein, as the transfer node may download data on behalf of the DIM and transfer the data to the DIM when certain conditions are met. The download node may achieve improved security, reliability, and speeds in transferring data to the DIM and avoid transmission inefficiencies, interruption, or failures at the DIM (e.g., when the DIM downloads directly from a data repository via an unstable or uncertain network).

Both the download node and the DIM may include internet-of-thing (IoT) devices in various forms, such as smart phones, personal computers, and wearable devices. An IoT device having a relatively larger storage capacity than another IoT device may serve as a download node, while the other IoT device may behave as a DIM and benefit from the staged service provided by the larger-capacity IoT. An example pair of the download node and the DIM may be: a personal computer as a download node and a cellular phone as a DIM, a network attached storage (NAS) as a download node and a mobile personal computer (e.g., laptop, tablet, and the like) as a DIM, a smartphone as a download node and a smart watch as a DIM, or a smart watch as a download node and earbuds as a DIM. Other examples of DIMs may include IoT sensors that may benefit from regular status examination, firmware updates, or security updates.

According to aspects of this disclosure, the download node and the DIM are wirelessly paired. The download node may access the internet or another network resource in a wireless or wired network. The download node may minimize the resource utilization at the DIM by transferring data via the staged service, such as a staged download service (SDS) under specific conditions, such that the DIM avoids wasting resources or opportunities when downloading tasks may be interrupted.

Aspects of the present disclosure provide a method for apportioning data transfer by a download node. When a DIM paired with the download node accepts a download task, the download node receives a notice from the DIM of the acceptance of the download task. The download node may then retrieve from a data repository a dataset specified by the download task. The DIM may elect to complete the download task via the download node instead of direct downloading from the data repository (e.g., to avoid interruptions). A processing device of the download node may stage the dataset in an SDS in preparation to transfer the dataset to the DIM. The processing device of the download node may initiate a transfer of at least a portion of the dataset to the DIM responsive to one or more data transfer properties satisfying a predefined set of conditions. The data transfer properties are determined based on a location and a movement of the DIM.

For example, determining the location and movement of the DIM may include determining whether a distance between the DIM and the download node is within a download region, and determining an available download time period in view of the distance, a perimeter of the download region, and the movement of the DIM. The one or more conditions may include the available download time period is sufficient for completing the transfer of the portion of the dataset to the DIM. The one or more conditions may also include the one or more data transfer properties exceed a threshold value. The one or more data transfer properties may include at least one of a data transfer rate, signal strength (e.g., signal to noise ratio), latency (e.g., feedback latency), a rate of error, or a level of security. In addition, the one or more conditions may also include that the portion of the dataset is executable, complete, or otherwise standalone from other portions of the dataset, such that the portion to be transferred by itself can be functional in the DIM. In some cases, the portion to be transferred is the whole dataset to be transferred, specified by the download task.

The SDS of the download node may provide reliable and efficient data transfer to the DIM. Because the processing device of the download node initiates the transfer based on the data transfer properties satisfying the set of conditions, chances of interruption or transfer failure of the portion are reduced or minimized, thus increasing reliability of the transfer. In addition, because the download node may retrieve the dataset at a faster rate, such as via a wired network, and the wireless pairing between the download node and the DIM may have a greater bandwidth than that between the DIM and the data repository, the overall data transfer rate provided by the SDS can be higher than the rate of direct transfer from the data repository to the DIM.

FIG. 1 depicts a high-level component diagram 100 of an illustrative example of a download node 150 and a device in motion (DIM) 120, in accordance with one or more aspects of the present disclosure. As shown, the DIM 120 may be paired to the download node 150 using a network link 125. The network link 125 may be local and short ranged. The download node 150 may access a data repository 110 via the network 115. The data repository 110 may include a server or a cloud storage, such as a public cloud storage, a private cloud storage, a hybrid cloud storage, or a community cloud. In some cases, the DIM 120 may have direct access to the data repository 110 via the network 105, as the data repository 110 may use the communication interface 112 to access the networks 105 or 115.

Both the DIM 120 and the download node 150 may be Internet-of-Thing (IoT) devices, of different storage capacities. For example, the download node 150 may include a personal computer and the DIM 120 may include a smartphone using the staged download services provided by the personal computer. In another example, however, the same smartphone may be used as the download node for other IoT devices having smaller storage capacities. For example, the smartphone may serve as the download node 150 for a wearable device as the DIM 120, such as a smart watch (e.g., a time and health tracker with motion and biometric sensors).

In general, the DIM 120 includes a processing device 122, a memory 124, a user interface 126, a communication device or interface 128, one or more location and motion sensors 130, and a download task identifier 132. One or more of the components of the DIM 120 may be integrated on a common or connected chip. The DIM 120 may also include other types of sensors (e.g., biometric, optical, temperature, etc.) not enumerated in FIG. 1.

In some cases, the processing device 122 of the DIM 120 may be a processor, such as a central processing unit (CPU), a mobile processor, or any integrated circuit operable to conduct mathematical operations. The processing device 122 is coupled to the memory 124, which stores instructions executable by the processing device 122. The memory 124 may include non-volatile, non-transitory computer-readable storage medium, such as random access memories, solid-state memories or drives, disk drives, or other data storage devices.

The user interface 126 may include one or more input and output devices operable to interact with a user, such as a touchscreen, a microphone, a speaker, one or more buttons or keys, a vibration generator, and the like. The user may provide input to the DIM 120 via the user interface 126, using touch, voice information, and/or motion. The user may receive output from the DIM 120 via the user interface 126, using graphical display, light signals (e.g., blinking LEDs), sounds, and tactile feedback (e.g., notification via vibrations). The embodiments of the user interface 126 depend on the complexity of the IoT device as the DIM 120. When the DIM 120 is a light weight sensor for data collection, the user interface 126 may include as simple as one light indicating operation conditions and one button for receiving control or activation inputs. When the DIM 120 is a sophisticated mobile device, such as a smartphone, a tablet, or a personal computer, the user interface 126 may provide a graphical user interface for particular software or operating system running thereon.

The communication device 128 is operable to establish a wireless network 125 and pair with the download node 150 in the wireless network. In some cases, the communication device 128 may establish a nearfield communication network, a short-range communication network, a local area network, or an infrared communication network as the wireless network 125. In some cases, the communication device 128 of the DIM 120 may use a short-range wireless technology standard such as the Bluetooth™ to pair with the download node 150 while the download node 150 access the data repository 110 via the Internet 115.

The location and motion sensor 130 may include sensors that directly measure or identify location or position of the DIM 120, and/or sensors that measure or identify relative location or position of the DIM 120 by tracking the movements. For example, the location and motion sensor 130 may include receivers for the global positioning system (GPS) or the like for ascertaining coordinate information of the DIM 120. The location and motion sensor 130 may also include one or more accelerometers, inertia measurement units (IMUs), time measurement sensors, and the like to track the movement of the DIM 120 and ascertain location information relative to a starting point (e.g., an initialization location with known coordinates). In some cases, aspects of this disclosure rely primarily on the relative locations of the DIM 120 and the download node 150 (which may be measured or computed from the different data types measured by the various sensors mentioned above).

In some cases, the location and motion sensor 130 may use communication signals and signal strength triangulation for computing the relative location to known signal terminals (e.g., base stations, Wi-Fi routers, etc.). The location or relative position information determined by the location and motion sensor 130 may be stored at the memory 124, and may be provided to the download node 150 via the communication device 128.

The DIM 120 may further include a download task identifier 132, which identifies, often without any user input, download tasks such as software updates, security updates, or improvement patches. In some cases, the download task identifier 132 may accept user created lists of download tasks and handle the download queue. In some cases, when the DIM 120 communicates with the data repository 110 (e.g., wither via the network 105 or via the download node 150), the download task identifier 132 may further determine or specify the related dataset 114 requested by the download tasks.

The download node 150 may include a processing device 140 and a memory 160 coupled to the processing device 140. The processing device 140 may include a stated download service (SDS) module 142 and a transfer properties evaluation module 144. The memory 160 may store the acceptance notice 162 from the DIM 120, the staged dataset 164 from the data repository 110, transfer conditions 168 for determining when to initiate transmission of the staged dataset 164 to the DIM 120, and information of the DIM location and download regions 170. In some cases, the staged dataset 164 may include one or more apportioned datasets 166.

Each of the one or more apportioned datasets 166 may be executable or functional in the DIM 120 upon transmission, even if another portion of the staged dataset 164 has not been transmitted to the DIM 120. For example, each apportioned dataset 166 may not be treated as a corrupted or incomplete download. The SDS module 142 of the processing device 140 may determine how the staged dataset 164 is apportioned, if the data repository 110 does not already provide such information. In some cases, the data repository 110 may provide instructions about packaging or apportioning the dataset 114, which the SDS module 142 may use to apportion the staged dataset 164.

During operation, the processing device 140 and the memory 160 are configured to receive, from the DIM 120 paired with the download node 150, the acceptance notice 162 related to a download task identified by the download task identifier 132. For example, the data repository 110 may publish the latest or newest firmware or operating system version via the network 105 for the IoT devices in the network 105. The download task identifier 132 may compare a current version of the firmware or operating system to the latest version available (e.g., either directly from the data repository 110 or indirectly via the download node 150) and identify a download task associated with the push of the latest version. When the DIM 120 accepts the download task identified by the download task identifier 132, the DIM 120 transmits the notice of accepting the download task (e.g., the acceptance notice 162) to the download node 150.

With the acceptance notice 162, the download node 150 retrieves a dataset specified by the download task from the data repository 110. The retrieved dataset is staged by the SDS module 142 as the staged dataset 164. For example, the processing device 140 may stage the dataset in a SDS in preparation to transfer the dataset to the DIM 120. The processing device 140 may initiate a transfer of at least a portion of the dataset to the DIM 120 responsive to one or more data transfer properties satisfying a predefined set of conditions, specified in the transfer conditions 168. The transfer properties evaluation module 144 may evaluate the one or more data transfer properties based on the information of the DIM locations and DL regions 170 received and stored in the memory 160.

In some cases, the processing device 140 and the memory 160 may determine the location and the movement of the DIM 120 by determining whether a distance between the DIM 120 and the download node 150 is within a threshold distance or a boundary of a download region. For example, the threshold distance may correspond to a level of signal strength or a signal strength to noise ratio. The processing device 140 and the memory 160 may determine the location and movement of the DIM 120 by determining an available download time period in view of the distance between the DIM 120 and the download node 150, a perimeter of the download region, and the movement of the DIM 120 as measured by the location and motion sensor 130.

The transfer properties evaluation module 144 may compare the determined location and movement of the DIM 120 to the transfer conditions 168 to decide whether the download node 150 should initiate the transfer the staged dataset 164. For example, the one or more transfer conditions 168 may include the available download time period being sufficient for completing the transfer of the portion of the dataset to the DIM 120 (e.g., so that the DIM 120 may at least execute the portion of dataset, as each apportioned dataset may be functional in the DIM 120 without other portions).

For example, the available download time period may be determined by first determining a movement speed of the DIM 120 based on the data captured by the location and motion sensor 130. The movement speed may include a vector indicating a direction of the movement. As the DIM 120 moves within a defined download (DL) region, such as one indicated by a signal strength or a data transfer rate of the network 125 based on the download node 150, the processing device 140 may estimate a remaining distance of travel of the DIM 120 from the currently reported relative location to the boundary of the DL region in the current movement direction. From the remaining distance of travel and the movement speeds of the DIM 120, the processing device 140 computes the available download time period and may determine whether the available download time period exceeds or equals to a time period required for downloading the portion of dataset without interruption or signal failures. In some cases, the portion of the dataset includes the complete dataset specified by the download task.

In another example, the one or more transfer conditions 168 may include the one or more data transfer properties exceeding a threshold value. For example, the one or more data transfer properties may include at least of a transfer rate, a signal strength, a latency (e.g., an upper limit or acceptable delay threshold), an error rate, or a level of security. For example, the download node 150 may, based on the relative location of the DIM 120, recognize the network 125 in regions of different security levels (as further discussed in relation to FIG. 2).

In some cases, the one or more conditions may include that the portion of the dataset to be transferred (upon the transfer being initiated) is standalone from other portions of the dataset. That is, if any staged portion is transferred, the download node 150 or the DIM 120 may expect the transfer to be successful and the transferred portion would not require re-transmission even if the transfer of other portions is interrupted or paused. The transfer properties evaluation module 144 may confirm that the DIM 120 may accept the staged portion to be acceptable as such.

For example, when the dataset 164 is standalone by itself only, the transfer properties evaluation module 144 may adjust other conditions (e.g., download time period and transfer rate) to determine when the transfer may be initiated. When the dataset 164 may be accepted as separated packets, such as when the DIM 120 has capacity to handle separate portions of the dataset 164, the transfer properties evaluation module 144 may reduce the requirement for the download time period and transfer rate accordingly.

Figure 2:
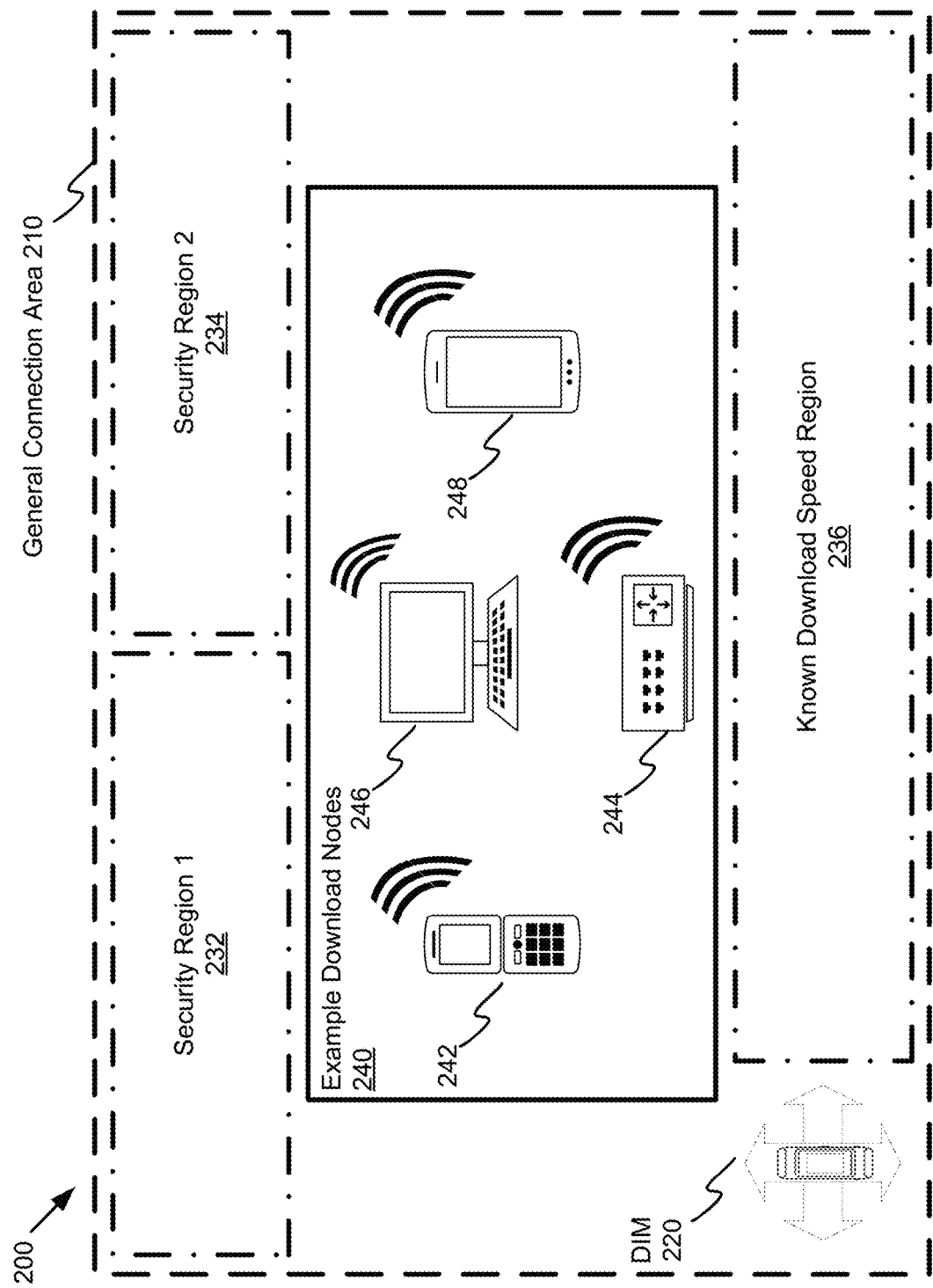
FIG. 2 is a schematic diagram illustrating movement of a DIM in different communication regions provided by a download node, in accordance with one or more aspects of the present disclosure.

FIG. 2 is a schematic diagram 200 illustrating movement of a DIM 220 in different communication regions (232, 234, and 236) provided by a download node 240, in accordance with one or more aspects of the present disclosure. The DIM 220 may also represent the DIM 120 of FIG. 1. FIG. 2 further illustrates the different predefined set of conditions and the data transfer properties based on the location and the movement of the DIM 120 mentioned above. As shown, the environment for the download node 240 and the DIM 220 (which may correspond to the download node 150 and the DIM 120 of FIG. 1) may be divided by geolocations, including a general connection area 210, a first security region 232, a second security region 234, and a region 236 with known download speeds of the DIM 220.

As shown in FIG. 2, the example download nodes 240 may be one or more of the illustrated IoT devices, including a cellular phone 242, a router 244, a computer 246, and a smart phone 248. The example DIM 220 may be a wearable device (e.g., a smart watch) paired with the download node 240 via a short range communication network. The DIM 220 may move along with the user relative to the download node 240. Due to such movement, the signal strength and data transfer rate may vary throughout the general connection area 210. When the DIM 220 is moved outside of the general connection area 210, the DIM 220 may still be able to connect to the download node 240 but may be subject to interference, interruption, or suffer a reduced data transfer rate.

Within the general connection area 210, different connection zones may be configured at the download node 240. For example, the download node 240 may configure one or more virtual fences or perimeters around a user's surrounding (e.g., home, office, etc.). Such virtual fences may be referred to as geofence or zones, which have specific network oriented capability, such as access to a particular wireless network for downloading. One of the IoT devices 242, 244, 246, and 248 may be designated as the download node 240 based on the storage capacity and download advantages (reliability, speeds, and/or security). Similar to the download node 140 in FIG. 1, the download node 240 may provide the staged download service (SDS) for the DIM 220. The download node 240 may be equipped with multiple geographical locators and/or communicator devices (such as Bluetooth, IR, or RFID) for allowing the DIM 220 to detect the download node 240.

During operation, the download node 240 may check for the DIM 220 in the data or update repository (such as the data repository 110 of FIG. 1) for services or firmware that the DIM 220 has installed. The download node 240 or the DIM 220 may note when a new version is available. The download node 240 may notify the update repository that the DIM 220 requires the latest version of certain software or services. The SDS of the download node 240 may then access the update repository (e.g., internet repositories such as RedHat Package Manager™ (RPM), npm repository, Maven™ repository, etc.) to download the specific versions of software as requested. The download node 240 then stores the requested versions and provides the DIM 220 metadata about the preferred update mechanisms and any limitations the DIM 220 may face, such as storage needs (e.g., the local storage of the DIM 220 may not be sufficient) or data transfer needs (e.g., the connection between the DIM 220 and the download node 240 may not be stable).

The SDS of the download node 240 may pre-optimize and prepare bindings for the DIM 220, such as sharing a potential API end point, a persistent volume, or a shared drive style mounting command in advance. When the DIM 220 that wishes to be updated comes into the geographical range of the download node 240, the DIM 220 may connect directly to the download node 240 based on the pre-handshake information exchanged, reducing any lead time in connecting and accessing the information to be downloaded. In this scenario, a data connection is established over the preferred medium and the update file transferred from the download node 240 to the DIM 220.

If the storage needs of the SDS are required, the download node 240 makes the storage available as a visible drive to the DIM 220. The DIM 220 may issue localized copy commands to retrieve the file. If, however, circumstances have changed (e.g., storage or bandwidth related) a new exchange of parameters happens, the DIM 220 may share the current location, current trajectory and current speed as well as the bandwidth available to the download node 240. The download node 240 receives this information as input and algorithmically calculate how long the DIM 220 will remain in range of the sensors of the download node 240 (the sensors providing information on the geofence or virtual regions of the download node 240). The download node 240 may also determine over what optional communication techniques (e.g., Wi-Fi, Bluetooth™, etc.) available with the DIM 220 and select or enable one that has the highest bandwidth, or the most appropriate bandwidth for the size of the dataset transfer required.

In some cases, the download node 240 may establish the first security region 232 and the second security region 234 based on different levels of security protocols. Some updates or downloads may be performed only when certain security protocols are in place. As such, the different security regions 232 and 234 may enable different types of downloads. For example, in a home setting, a user may configure the security region 232 corresponding to home office, where password protected information (e.g., related to confidential information) may be staged in the download node 240 and accessed by the DIM 220 (e.g., push notification regarding such download availability staged at the download node 240) when the DIM 220 enters the first security region 232.

Similarly, the user may configure the security region 324 corresponding to a home theater, where content based notification and download may be provided. At a lower security level than the first security region 232, the second security region 234 may be open to additional and a larger number of IoT devices (e.g., multiple DIMs). For example, two or more IoT devices may access a common staged download service when the IoT devices enter the second security region 234. The DIM 220 and other IoT devices may provide location and motion information to the download node 240 to enable such geofencing or region enabled staged download services.

Based on the wealth of information and the specific situation of the DIM 220, the download node 240 makes an informed decision of whether or not the dataset transfer may proceed. For example, if there is a risk that the DIM 220 cannot receive the dataset (or a functional portion thereof, as discussed above in FIG. 1), the download node 240 may store the information until the DIM 220 meets the required transfer conditions, such as until the DIM 220 enters the known download speed region 236 and will stay within the region for a predictable period of time (e.g., based on the movement speeds or behavioral patterns acquired in historic data).

In some cases, the download node 240 and the DIM 220 may interface with other point-to-point (P2P) mechanisms to send the update to the DIM 220 (or a client in general) at a time that is safe (e.g., P2P transfer in a node hop manner). In an embodiment, the download node 240 may update the existing packages locally if it finds a new version of the software is available and proactively make the most up to date version available for the next time the DIM 220 enters a corresponding region for installing the update. For example, if the DIM 220 misses an update because one or more of the download conditions are not satisfied (e.g., when the DIM 220 is outside of the regions 232, 234, and/or 236), and when the next update has been available, the download node 240 may stage the dataset of the latest update only (and skipping the missed update earlier).

The regions 232, 234, and 236 provide a more predictable management of different types of downloads or updates for the DIM 220. Such management allows for proactive client management and minimize the need to block client requests. Furthermore, the disclosed techniques allow the update process to be separated from the act of obtaining the sources (e.g., having delegated or outsourced to the download node 240). As such, the DIM 220 may save on CPU and other resources, as well as the temporary storage of partial files that would need to be cleaned up and could potentially cause conflicts.

The disclosed techniques also save on roundtrips time to the internet and outside of the mesh (of local networks) by having a localized version stored in the download node 240. This allows for redundant approaches to updates and allowing the download node 240 to coordinate a means to transfer the file to the DIM 220 (pushing mandatorily if needed), bringing a wider update strategy to the mesh.

Figure 3:
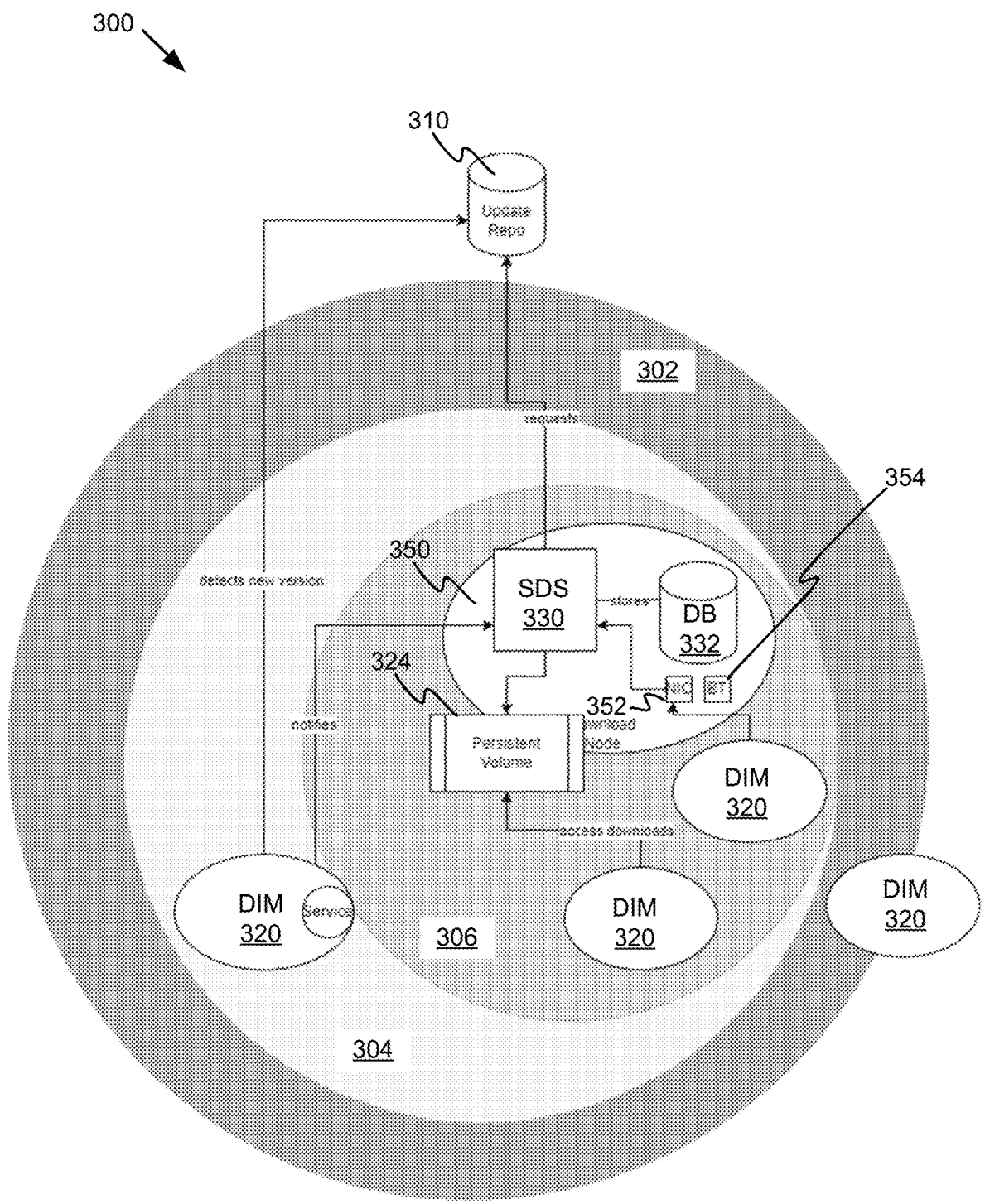
FIG. 3 is a schematic diagram illustrating operations of the download node in response to a DIM moving in different regions, in accordance with one or more aspects of the disclosure.

FIG. 3 is a schematic diagram 300 illustrating operations of the download node 350 in response to a DIM 320 moving through different regions 302, 304, and 306, in accordance with one or more aspects of the disclosure. As shown in FIG. 3, the download node 350 may configure three regions based on the relative location of the DIM 320. The region 302 may be configured as an out-of-range region, in which the DIM 320 has weak signals relative to both the update repository 310 and the download node 350. The region 304 may be configured as an intermediate region, where the connection from the DIM 320 to the update repository 310 and the download node 350 is available but not stable, with low signal strength, or with a low data transfer rate. The region 306 may be configured as a download region, similar to the known download speed region 236 of FIG. 2, where the connection from the DIM 320 to the update repository 310 is not required, and the connection from the DIM 320 to the download node 350 is secure and stable.

As the DIM 320 moves from left to right as illustrated in FIG. 3 (four snapshot instances are shown), the DIM 320 moves from the region 304 into the region 306, and exits the region 306 into the region 302. When the DIM 320 is within the region 304, the DIM 320 detects a new version of a firmware, software, or operating system is available from the update repository 310. The DIM 320 transmits a notice of the available new version to the staged download service (SDS) 330 of the download node 350. The SDS 330 requests and retrieves the new version from the update repository 310. The retrieved new version may be stored at the database 332 of the download node 350. The SDS 330 may apportion and stage a portion of the dataset of the new version in a persistent volume 324.

After the DIM 320 has entered the region 306, the DIM 320 may access the downloads of the new version in the persistent volume 324 provided by the SDS 330. For example, the DIM 320 may communicate with the SDS 330 via a network interface card (NIC) 352 or by Bluetooth™ (BT) 354. The SDS 330 evaluates the location and movement of the DIM 320 and determines whether one or more data transfer conditions, such as available uninterrupted transfer time and security levels are met. As shown, the SDS 330 may evaluate the travel time from the left instance of the DIM 320 in the region 304 to the right instance of the DIM 320 in the region 302, and determine whether the travel time exceeds a threshold time period required for downloading the new version. If so, the SDS 330 may initiate the data transfer automatically; otherwise, the SDS 330 may provide notifications to the DIM 320, such as prompting the available new version as well as asking the user whether the predicted movement of the DIM 320 will be changed to allow for a complete data transfer.

Figure 4:
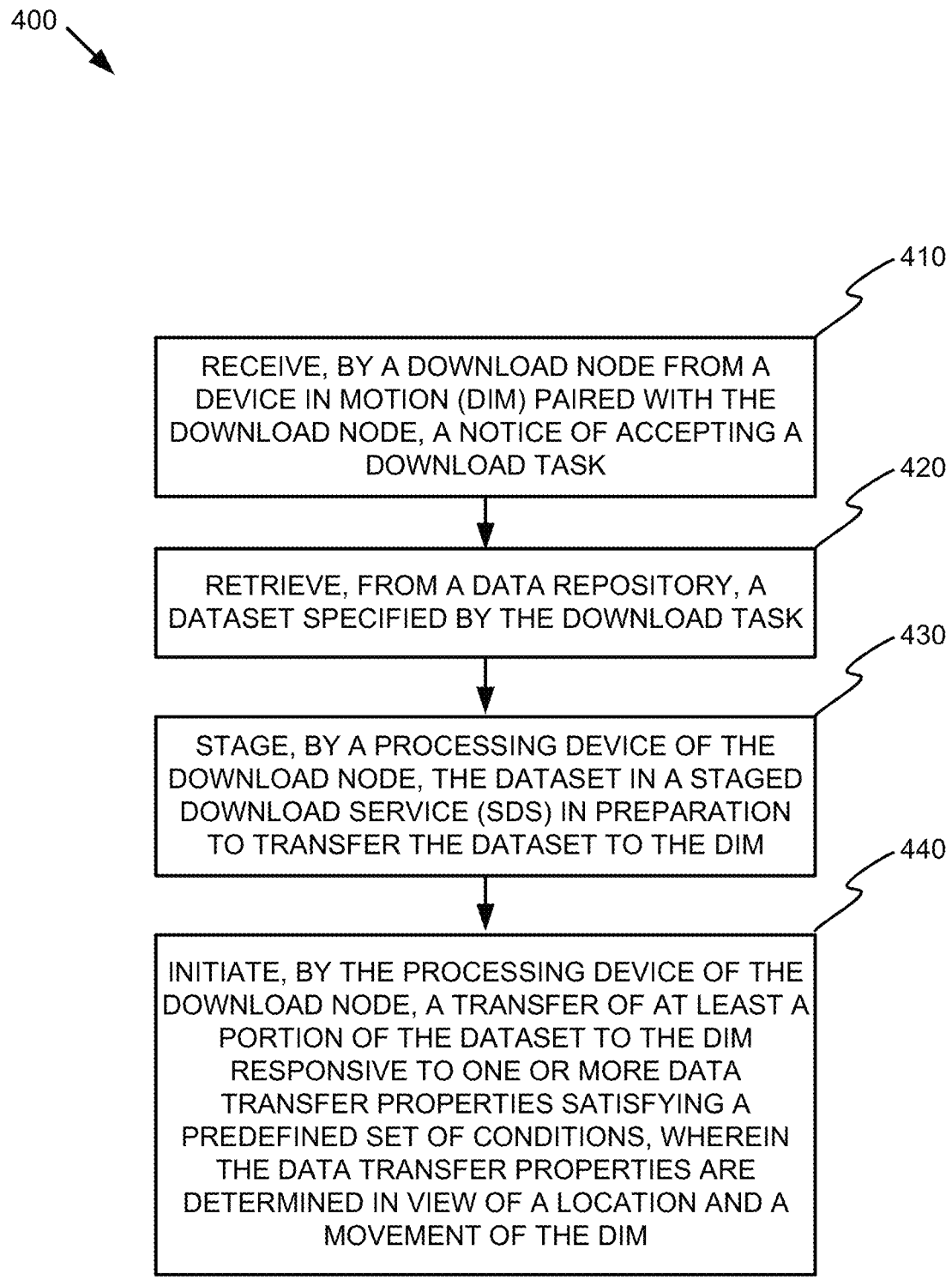
FIG. 4 a flow diagram of a method of providing staged download service, in accordance with one or more aspects of the disclosure.

FIG. 4 is a flow diagram of a method 400 of providing staged download service, in accordance with one or more aspects of the disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by staged download service 142 of the processing device 140 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at 410, a download node receives from a DIM paired therewith at notice accepting a download task. For example, the DIM may detect a new version of firmware, software, or operating system and notify the download node that the DIM has agreed to download and install the new version. The notice accepting the download task may include information of an update repository where the download node may retrieve information related to the download task.

At 420, the download node retrieves, from a data repository, a dataset specified by the download task. For example, the download node may retrieve and save the data package of the new version locally, such as in a database or a storage device. As discussed above, the download node may include any IoT device that has a relatively larger storage capacity than the storage capacity than the DIM.

At 430, a processing device of the download node stages the dataset in a staged download service (SDS) in preparation to transfer the dataset to the DIM. The SDS may allow the DIM to access the dataset via a persistent volume.

At 440, the processing device of the download node initiates a transfer of at least a portion of the dataset to the DIM responsive to one or more data transfer properties satisfying a predefined set of conditions. The data transfer properties are determined in view of a location and a movement of the DIM.

Figure 5:
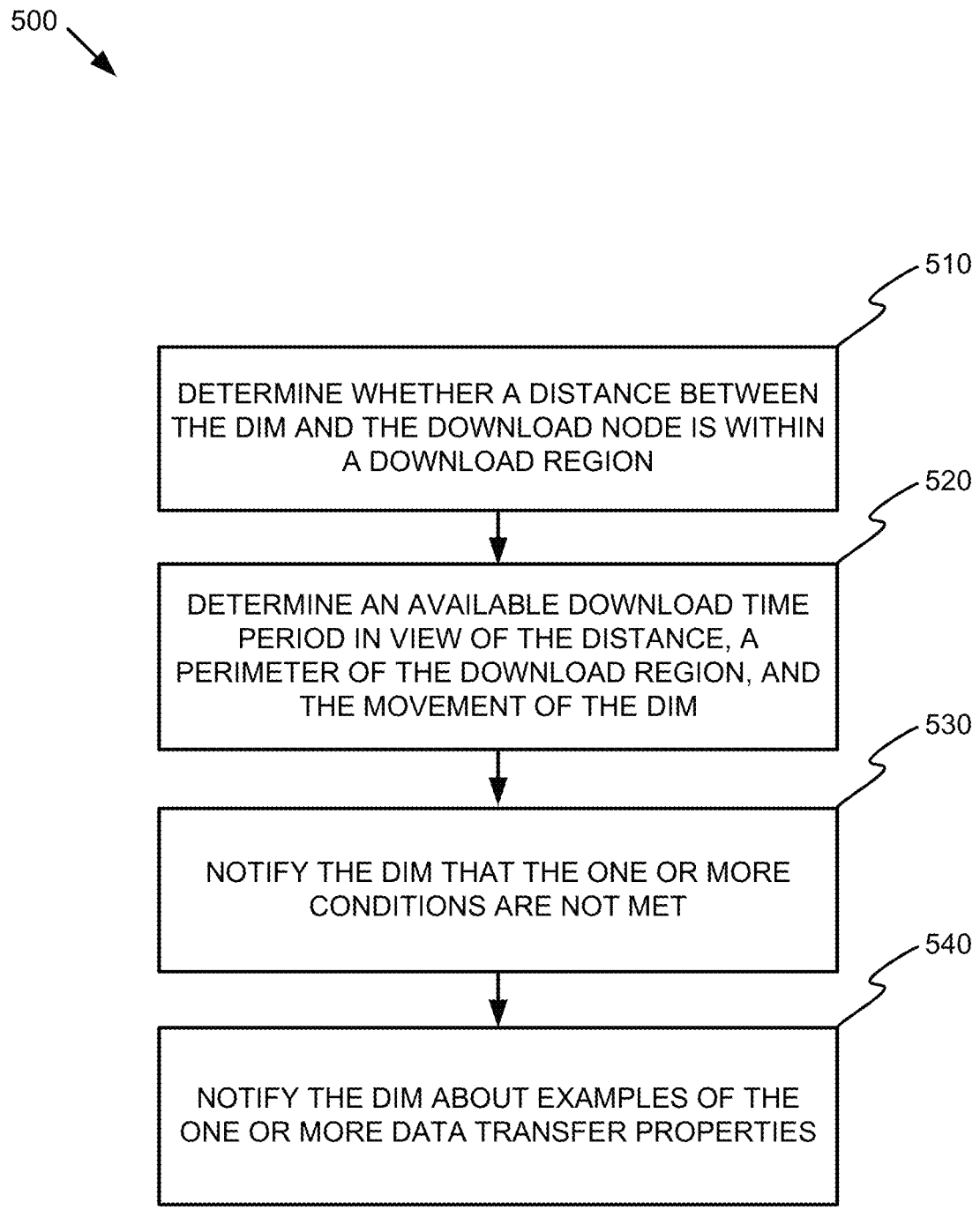
FIG. 5 is a flow diagram of a method of providing notifications in relation to the staged download service of FIG. 4, in accordance with one or more aspects of the disclosure.

FIG. 5 is a flow diagram of a method 500 of providing notifications in relation to the staged download service of FIG. 4, in accordance with one or more aspects of the disclosure. As shown, at 510, the download node may determine whether a distance between the DIM and the download node is within a download region. At 520, the download node may determine an available download time period in view of the distance, a perimeter of the download region, and the movement of the DIM.

If the distance between the DIM and the download node exceeds the bounds of the download region, or if the available download time exceeds a time period required for data transfer without interruption, at 530, the download node may notify the DIM that the one or more conditions are not met. In addition, at 540, the download node may notify the DIM about examples of the one or more data transfer properties required for initiating the data transfer of the dataset (or a portion thereof).

According to aspects of the present disclosure, the one or more conditions may include the available download time period being sufficient for completing the transfer of the portion of the dataset to the DIM. The one or more conditions may include the one or more data transfer properties exceeding a respective threshold value. For example, the one or more data transfer properties may include a transfer rate, a signal strength, a latency, an error rate, a level of security, or a combination thereof. In some cases, the one or more conditions may include the portion of the dataset to be transferred is standalone from other portions of the dataset to be separately transferred. For example, the portion of the dataset may be executable and functional on the DIM without the other portions of the dataset. In some examples, the portion of the dataset is the dataset itself.

According to aspects of the present disclosure, the DIM is paired with the download node via a wireless network comprising at least one of: a nearfield communication network, a short-range communication network, a local area network, or an infrared communication network, and wherein the download node has a storage capacity substantially greater than that of the DIM for providing the SDS.

Figure 6:
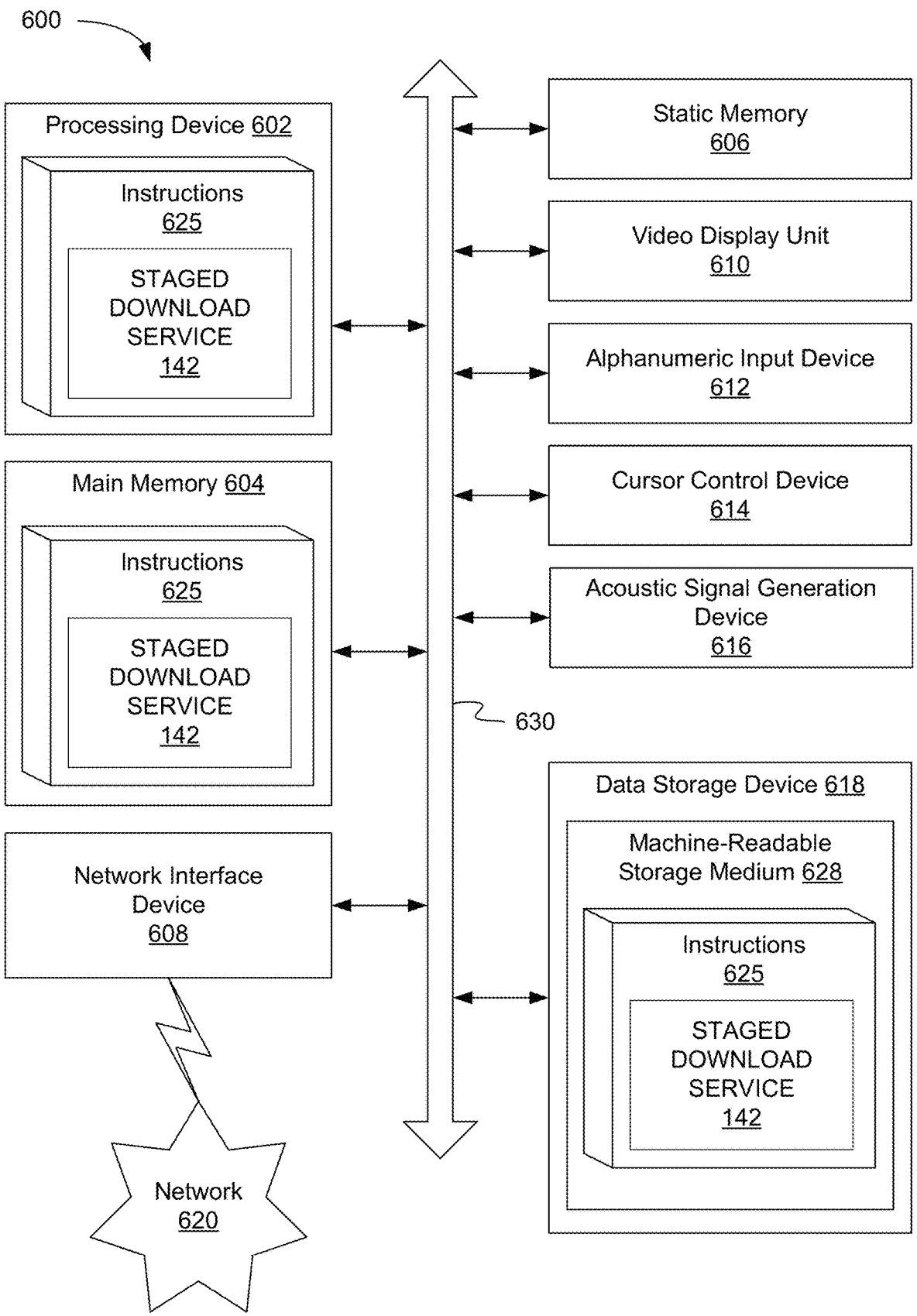
FIG. 6 is a block diagram of an example apparatus that may perform one or more of the operations described herein, in accordance with one or more aspects of the disclosure.

FIG. 6 is a block diagram of an example computing device 600 that may perform one or more of the operations described herein, in accordance with one or more aspects of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a non-volatile memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for apportioning and staging data transfer by a download node, e.g., the staged download service 142 for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "determining," "scanning," "generating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for apportioning data transfer by a download node, the method comprising:
    receiving, from a device in motion (DIM) paired with the download node, a notice of accepting a download task;
    retrieving, from a data repository, a dataset specified by the download task;
    staging, by a processing device of the download node, the dataset in a staged download service (SDS) in preparation to transfer the dataset to the DIM; and
    initiating, by the processing device of the download node, a transfer of at least a portion of the dataset to the DIM responsive to one or more data transfer properties satisfying a predefined set of conditions, wherein the data transfer properties are determined in view of a location and a movement of the DIM.

2. The method of claim 1, wherein determining the location and the movement of the DIM comprises:
    determining whether a distance between the DIM and the download node is within a download region; and
    determining an available download time period in view of the distance, a perimeter of the download region, and the movement of the DIM.

3. The method of claim 2, wherein the one or more conditions comprise at least one of:
    the available download time period is sufficient for completing the transfer of the portion of the dataset to the DIM;
    the one or more data transfer properties exceed a threshold value, wherein the one or more data transfer properties comprise at least one of a transfer rate, a signal strength, a latency, an error rate, or a level of security; or the portion of the dataset is standalone from other portions of the dataset.

4. The method of claim 3, wherein the portion of the dataset comprises the dataset.

5. The method of claim 1, wherein staging the dataset in the SDS comprises allowing the DIM to access the dataset via a persistent volume.

6. The method of claim 1, wherein the DIM is paired with the download node via a wireless network comprising at least one of: a nearfield communication network, a short-range communication network, a local area network, or an infrared communication network, and wherein the download node has a storage capacity substantially greater than that of the DIM for providing the SDS.

7. The method of claim 1, further comprising:
notifying the DIM that the one or more conditions are not met; and
notifying the DIM about examples of the one or more data transfer properties.

8. An apparatus of a download node, the apparatus comprising:
a memory; and
a processing device coupled to the memory, the processing device and the memory to:
receive, from a device in motion (DIM) paired with the download node, a notice of accepting a download task;
retrieve, from a data repository, a dataset specified by the download task;
stage, by a processing device of the download node, the dataset in a staged download service (SDS) in preparation to transfer the dataset to the DIM; and
initiate, by the processing device of the download node, a transfer of at least a portion of the dataset to the DIM responsive to one or more data transfer properties satisfying a predefined set of conditions, wherein the data transfer properties are determined in view of a location and a movement of the DIM.

9. The apparatus of claim 8, wherein the processing device and the memory determines the location and the movement of the DIM by:
determining whether a distance between the DIM and the download node is within a download region; and
determining an available download time period in view of the distance, a perimeter of the download region, and the movement of the DIM.

10. The apparatus of claim 9, wherein the one or more conditions comprise at least one of:
the available download time period is sufficient for completing the transfer of the portion of the dataset to the DIM;
the one or more data transfer properties exceed a threshold value, wherein the one or more data transfer properties comprise at least one of a transfer rate, a signal strength, a latency, an error rate, or a level of security; or
the portion of the dataset is standalone from other portions of the dataset.

11. The apparatus of claim 10, wherein the portion of the dataset comprises the dataset.

12. The apparatus of claim 8, wherein the processing device and the memory stages the dataset in the SDS by allowing the DIM to access the dataset via a persistent volume.

13. The apparatus of claim 8, wherein the DIM is paired with the download node via a wireless network comprising at least one of: a nearfield communication network, a short-range communication network, a local area network, or an infrared communication network, and wherein the download node has a storage capacity substantially greater than that of the DIM for providing the SDS.

14. The apparatus of claim 8, wherein the processing device and the memory are further to:
notify the DIM that the one or more conditions are not met; and
notify the DIM about examples of the one or more data transfer properties.

15. A non-transitory computer-readable storage medium having instructions stored thereon that, when executed by a download node for providing staged download service (SDS), cause the download node to:
receive, from a device in motion (DIM) paired with the download node, a notice of accepting a download task;
retrieve, from a data repository, a dataset specified by the download task;
stage, by a processing device of the download node, the dataset in a staged download service (SDS) in preparation to transfer the dataset to the DIM; and
initiate, by the processing device of the download node, a transfer of at least a portion of the dataset to the DIM responsive to one or more data transfer properties satisfying a predefined set of conditions, wherein the data transfer properties are determined in view of a location and a movement of the DIM.

16. The non-transitory computer-readable storage medium of claim 15, further comprising instructions stored thereon that, when executed by the download node, cause the download node to:
determine whether a distance between the DIM and the download node is within a download region; and
determine an available download time period in view of the distance, a perimeter of the download region, and the movement of the DIM.

17. The non-transitory computer-readable storage medium of claim 16, wherein the one or more conditions comprise at least one of:
the available download time period is sufficient for completing the transfer of the portion of the dataset to the DIM;
the one or more data transfer properties exceed a threshold value, wherein the one or more data transfer properties comprise at least one of a transfer rate, a signal strength, a latency, an error rate, or a level of security; or
the portion of the dataset is standalone from other portions of the dataset.

18. The non-transitory computer-readable storage medium of claim 15, further comprising instructions stored thereon that, when executed by the download node, cause the download node to provide a persistent volume for the DIM to access the dataset.

19. The non-transitory computer-readable storage medium of claim 15, wherein the DIM is paired with the download node via a wireless network comprising at least one of: a nearfield communication network, a short-range communication network, a local area network, or an infrared communication network, and wherein the download node has a storage capacity substantially greater than that of the DIM for providing the SDS.

20. The non-transitory computer-readable storage medium of claim 15, further comprising instructions stored thereon that, when executed by the download node, cause the download node to:
  notify the DIM that the one or more conditions are not met; and
  notify the DIM about examples of the one or more data transfer properties.

\* \* \* \* \*